United States Patent [19]

McKay et al.

[11] Patent Number: 4,993,394
[45] Date of Patent: Feb. 19, 1991

[54] FUEL INJECTION INTERNAL COMBUSTION ENGINES

[75] Inventors: Michael L. McKay, Willetton; Steven R. Ahern, Claremont, both of Australia

[73] Assignee: Orbital Engine Company Propriety Limited, Balcatta, Australia

[21] Appl. No.: 394,168

[22] Filed: Jul. 7, 1989

Related U.S. Application Data

[63] Continuation of Ser. No. 51,463, Mar. 11, 1987, abandoned.

[30] Foreign Application Priority Data

Jul. 19, 1985 [AU] Australia .............. PH01560

[51] Int. Cl.⁵ ............................................ F02M 67/02
[52] U.S. Cl. ....................................... 123/533; 123/531
[58] Field of Search ................. 123/531–535, 123/299, 300, 305

[56] References Cited

U.S. PATENT DOCUMENTS

| | | | |
|---|---|---|---|
| Re. 14,359 | 9/1917 | Day et al. | 123/533 |
| 1,149,321 | 8/1915 | Baker | 123/533 |
| 1,166,937 | 1/1916 | Roesti | 123/533 X |
| 1,592,260 | 7/1926 | de Waern | 123/305 X |
| 3,892,208 | 7/1975 | Anderson et al. | 123/299 |
| 4,499,871 | 2/1985 | Neitz et al. | 123/305 X |
| 4,674,462 | 6/1987 | Koch et al. | 123/533 |
| 4,685,432 | 8/1987 | Saito et al. | 123/276 |
| 4,693,224 | 9/1987 | McKay | 123/531 |
| 4,753,213 | 6/1988 | Schlunke et al. | 123/533 |
| 4,759,335 | 7/1988 | Ragg et al. | 123/531 |

FOREIGN PATENT DOCUMENTS

| | | |
|---|---|---|
| 867327 | 2/1953 | Fed. Rep. of Germany . |
| 903518 | 2/1954 | Fed. Rep. of Germany . |
| 787439 | 12/1957 | United Kingdom . |

*Primary Examiner*—Tony M. Argenbright
*Attorney, Agent, or Firm*—Armstrong, Nikaido, Marmelstein, Kubovcik & Murray

[57] ABSTRACT

In a spark ignition engine, fuel is injected directly into the cylinder volume. In order to obtain improved levels of combustion efficiency and reduced emissions the position of the fuel cloud within the cylinder volume is varied with engine load by controlled variation of fuel injection pressure. In particular, there is disclosed a method and apparatus for injection of fuel by compressed air where the position of the fuel cloud within the cylinder volume is controlled by conjoint control of fuel and air injection pressure. The invention has particular application to two-stroke cycle engines.

22 Claims, 3 Drawing Sheets

FUEL INJECTION INTERNAL COMBUSTION ENGINES

This application is a continuation of application Ser. No. 051,463, filed Mar. 11, 1987, now abandoned.

This invention relates to the injection of metered quantities of fuel into the combustion chamber of an internal combustion engine.

In order to obtain the more desirable levels of fuel efficiency and exhaust emission control it is desirable to control the position of the fuel cloud in the combustion chamber. It has been observed that the preferred cloud position is not constant, and particularly varies with engine load, which itself is engine speed related. In two stroke cycle engines the control of the fuel cloud is of particular importance to limit the loss of fuel through the exhaust port which may not be fully closed during at least part of the period of injection of the fuel.

It is understood that under light loads, and hence low fuelling rates, the degree of penetration of the fuel into the cylinder should be restricted to reduce the degree of dilution of the fuel by mixing with the air in the combustion chamber. The dilution of the fuel gives a lean mixture that is more difficult to ignite, and to maintain combustion until the full fuel charge is burnt. However at high load and high fuelling rates the degree of penetration should be increased to ensure the greater quantity of fuel has access to sufficient air (oxidant) to achieve combustion of all of the fuel.

The principal object of the present invention is to provide a method of control of the fuelling of an engine so that the position of the fuel cloud may be varied to assist in the more efficient combustion of the fuel.

With this object in view there is provided a method of controlling fuel distribution in an internal combustion engine comprising directly injecting fuel into the combustion chamber through a nozzle under conditions so the fuel penetrates a first distance into the combustion chamber, and varying said conditions in response to the engine load demand being above a predetermined value to increase the distance of penetration of the fuel into the combustion chamber.

Conveniently the pressure effecting delivery of the fuel through the nozzle may be increased in a stepwise manner at one or more selected levels of engine load demand or the pressure increases may be progressive over one or more ranges of engine speed or load to vary the degree of penetration of the fuel.

More specifically there is provided a method of controlling fuel distribution in the combustion chamber of an internal combustion engine comprising combining a metered quantity of fuel delivered at delivery pressure and a gas mass, delivering the fuel-gas mixture so formed at a mixture delivery pressure through a nozzle into the combustion chamber, regulating the pressure differential between the fuel and gas mass to maintain a substantially uniform pressure differential over the engine load demand, and controlling the pressure of the fuel-gas mixture during delivery to the combustion chamber so said pressure is inreased in response to the engine load demand above a predetermined value, whereby the extent of penetration of the fuel into the chamber is increased.

The maintenance of the steady pressure differential between the fuel and the gas mass simplifies the controlling of the metered quantity of fuel as in that control procedure it is not necessary to provide compensation for variation in that pressure differential.

Preferably the control of the fuel penetration is achieved by varying the fuel pressure with engine speed and consequently varying the gas pressure to maintain a steady pressure differential. Accordingly the variation of the fuel pressure will have the end result of varying the pressure available to deliver the fuel-gas mixture through the nozzle to the combustion chamber.

The increases in pressure are preferably effected at one or more selected engine speeds within the normal operating speed range, and it has been found that one increase in the mid-speed range is sufficient in many engine applications.

In the regulation of the pressure differential between the gas and the fuel delivered thereinto, specific advantages arise from the regulations being based on varying the pressure of the fuel as the control function, and effecting a consequential variation in the gas pressure to maintain the selected pressure differential.

One of the advantages is the gas is less viscous than a liquid fuel and so, in a regulation situation, the controlled gas pressure will not be as affected by flow rate variations through the pressure regulator. This results in the pressure differential being less sensitive to flow rate variation of either the fuel or gas. This feature is of particular significance where the pumps providing the fuel and gas are engine driven and have outputs that are significantly speed related.

Accordingly, it is another object of the present invention to provide a fuel-gas regulation system that is particularly suitable for incorporation in a fuel injection system employing pressurized fuel and gas supplies.

With this other object in view there is provided a fuel injection system for internal combustion engines wherein a metered quantity of fuel under pressure is delivered into a gas to form a fuel-gas charge, characterised in that the fuel pressure is regulated to a preselected value and the gas pressure is regulated relative to the fuel pressure ot maintain a predetermined pressure differential between the fuel and gas during metering of the fuel.

Conveniently the regulated pressure of the fuel is selectable between at least two predetermined values. Preferably the variation in the regulated fuel pressure is effected at a selected speed, within the normal operating speed range of the engine, and the variation is preferably an increase as the engine speed exceeds the selected value. A corresponding decrease is effected as the engine speed falls below that selected value. Preferably the fuel pressure is regulated to a preselected value relative to atmospheric pressure.

In accordance with a further aspect of the present invention there is provided for an engine fuel system, a fuel pressure regulator set to provide a predetermined fuel output pressure, and means adapted to vary said pressure a predetermined amount in response to a selected engine condition.

Conveniently the predetermined fuel output pressure is set by a resilient means prestressed to a set degree, and the means to vary the output pressure adjust the degree of stress on the resilient means. Preferably the resilient means is a spring tensioned or compressed to a degree to provide a load necessary to set the required base fuel pressure. The degree of compression or tension of the spring is increased to incrse the fuel output pressure upon the engine reaching a predetermined load and is subsequently reduced upon the engine speed falling below the selected load.

In this specification reference is made to varying the penetration of the fuel spray by adjusting the delivery pressure of the fuel into the combustion chamber, in relation to a particular change or changes in engine load demand, and this demand may be detected in a number of ways. In many engine applications, the speed of the engine under most operating conditions is indicative of the engine load, particularly where the engine is normally operated within specific speed ranges, such as in outboard marine engines. Accordingly as engine speed is conveniently sensed, and requires comparatively simple sensors, the engine speed is monitored to detect the occurrence of the load change at which the change in fuel penetration is to be affected.

The invention will be more readily understood from the following description, with reference to the accompanying drawings, of one practical arrangement of the fuel and air pressure regulating device incorporated in a fuel injection system.

Figure 1:
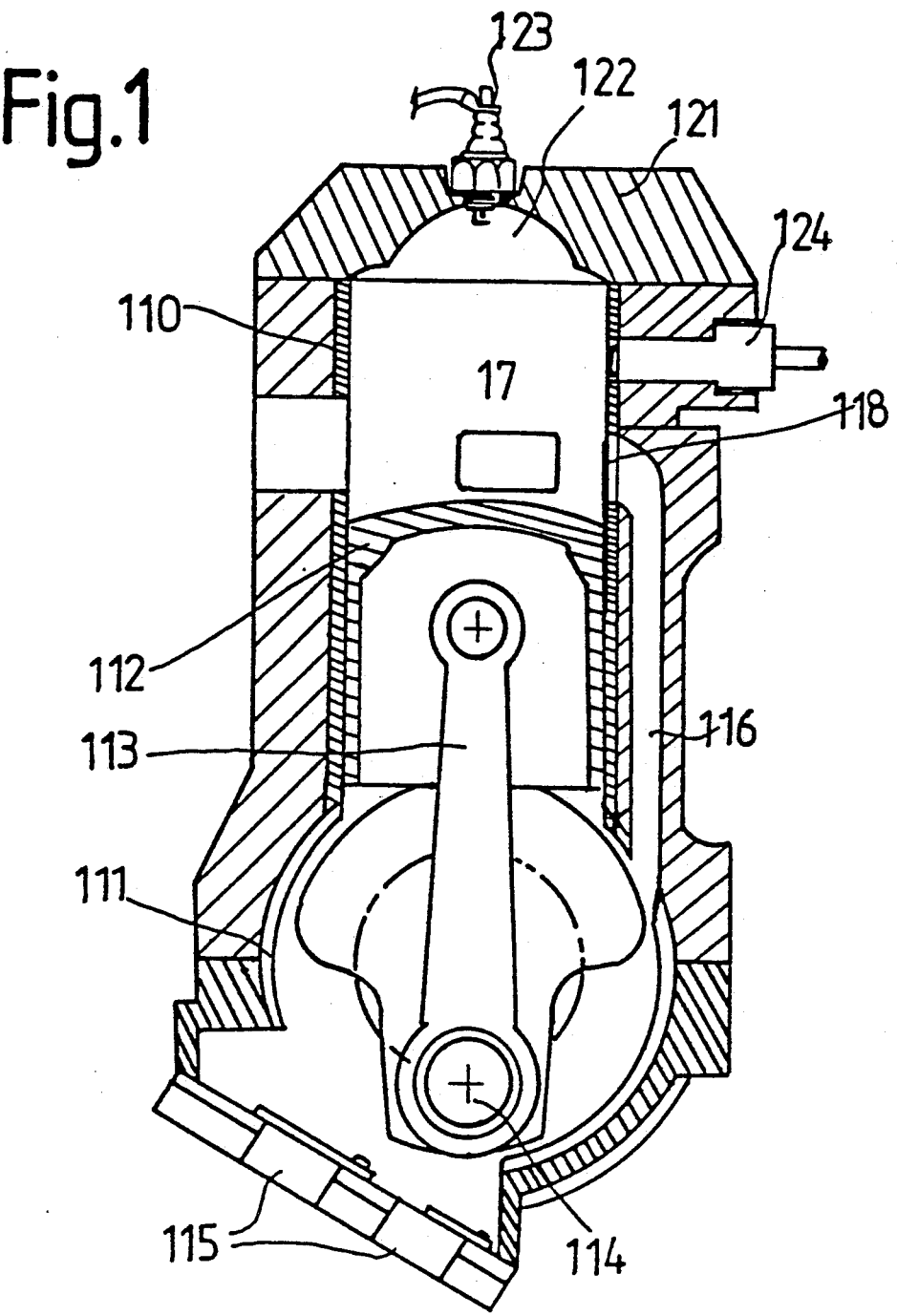
FIG. 1 is an axial section view of a two stroke cycle engine having a direct in-cylinder fuel injection system.

Referring now to FIG. 1 the engine 109 is a single cylinder two stroke cycle engine, of generally conventional construction, having a cylinder 100, crankcase 111 and piston 112 that the reciprocates in the cylinder 110. The pistion 112 is coupled by the connecting rod 113 to the crankshaft 114. The crankcase is provided with air induction ports 115, incorporating conventional reed valves 119 and three transfer passages 116 (only one shown) communicate the crankcase with respective transfer ports, two of which are shown at 117 and 118, the third being the equivalent to 117 on the opposite side of port 118.

The transfer ports are each formed in the wall of the cylinder 110 with their respective upper edge located in the same diametral plane of the cylinder. An exhaust port 120 is formed in the wall of the cylinder generally opposite the central transfer port 118.

The detachable cylinder head 121 has a combustion cavity 122 into which the spark plug 123 projects. The cavity 122 is located substantially symmetrically with respect to the axis of the cylinder, and the spark plug is loacted on that axis. The fuel injector 124 is located in the wall of the cylinder 110 between the transfer ports and the cylinder head. In the configuration shown the injection nozzle 124 is directly above the central transfer port 118.

The injector 124 is an integral part of a fuel metering and injection system whereby fuel entrained in air is injected directly into the combustion chamber of the engine by the pressure of the air supply. One particular form of fuel metering and injection unit is illustrated in FIG. 2 of the drawings which is representative of a type of metering and injection unit that the fuel and air pressure regulating system of the present invention is applicable to.

Figure 2:
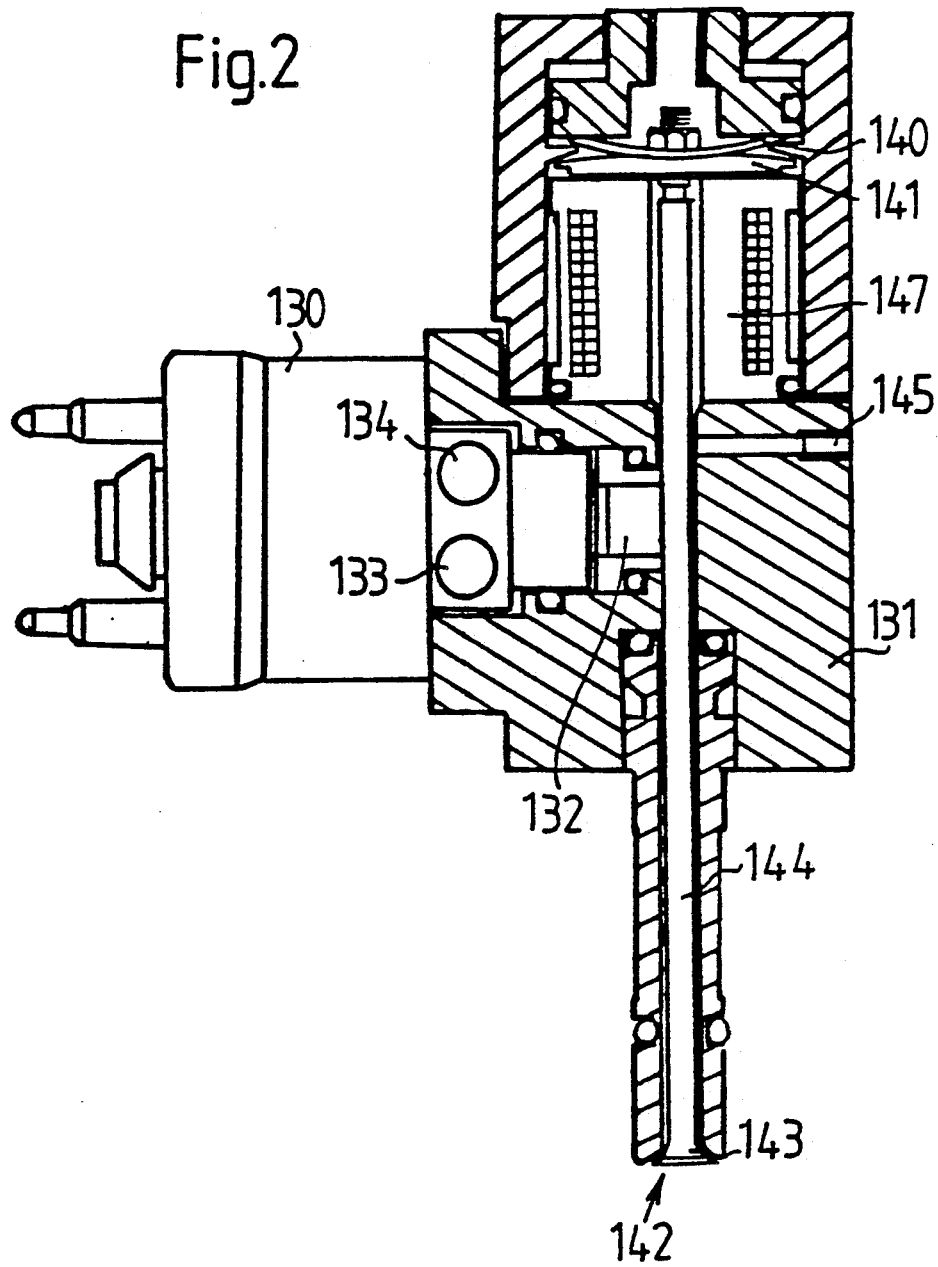
FIG. 2 is an elevational view, partly in section of a fuel metering and injection unit suitable for use with the engine shown in FIG. 1.

The fuel metering and injection unit in FIG. 2 incorporates a suitable metering device 130, such as an automotive type throttle body injector, coupled to an injector body 131 having a holding chamber 132 therein. Fuel is delivered from a fuel pump (not shown) through fuel inlet port 133 to the metering device 130 which meters an amount of fuel into the holding chamber 132 in accordance with the engine fuel demand. Excess fuel supplied to the metering device is returned to a fuel reservoir via fuel return port 134. The particular construction of the fuel metering device 130 is not critical to the present invention and any suitable device may be used.

In operation, the holding chamber 132 is pressurized by air supplied supplied through an air inlet port 145 in the body 131. An injection valve 143 is actuated to permit the pressurized air to discharge the metered amount of fuel from the chamber 132 through injector nozzle 142 into a combustion chamber of the engine. Injection valve 143 of the injector nozzle is of the poppet valve construction opening inwardly to the combustion chamber, that is, outwardly from the holding chamber.

The injection valve 143 is coupled, via a valve stem 144, which passes through the holding chamber 132, to the armature 141 of solenoid 147 located within the injector body 131. The valve 143 is biased into the closed position by the disc spring 140 and is opened by energizing the solenoid 147. Energizing of the solenoid 147 is controlled in time relation to the engine cycle to effect delivery of the fuel from the holding chamber 132 to the engine combustion chamber.

Further details of the operation of the fuel metering and injection systems incorporating a holding chamber such as that described with refference to FIG. 2 is disclosed in U.S. Pat. No. 4,693,224, the disclosure of which is incorporated herein by reference.

It will be appreciated that the fuel is delivered into the holding chamber 132 by the metering device 130 against the pressure of the air existing in the chamber. Accordingly, the difference in pressure between the fuel supply at the metering device and the air in the holding chamber is relevant to the quantity of fuel that will be delivered into the holding chamber. In view of the need for accuracy in the fuel metering, both from the aspect of fuel economy and exhaust emission control, it is important to effectively control this pressure difference.

Figure 3:
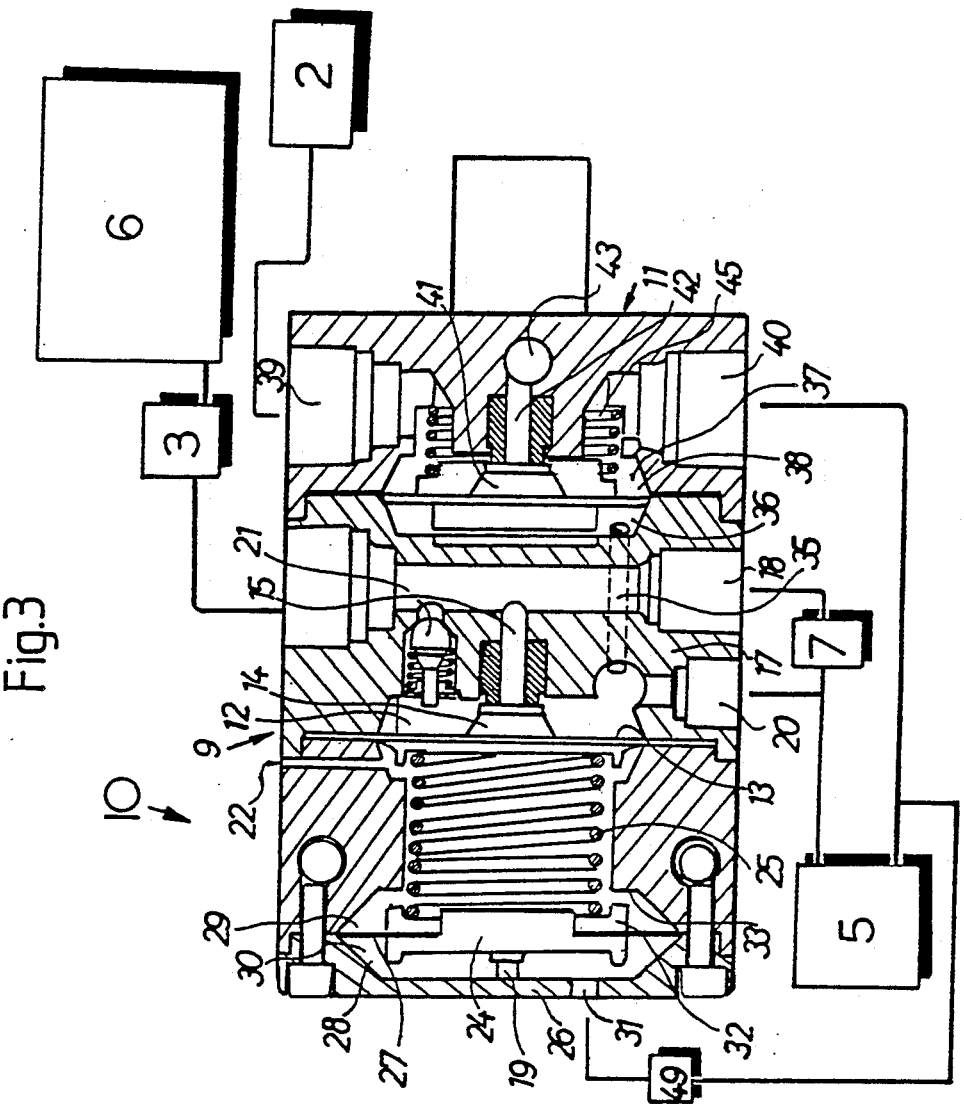
FIG. 3 is a sectional view of a combined fuel and air pressure regulator suitable for use with the metering and injection unit shown in FIG. 2, shown in conjunction diagramatically with other components of a fuel injection system.

FIG. 3 illustrates a fuel injection system incorporating a combined fuel and air regulator which is suitable for use with the fuel metering and injection unit as described above with reference to FIG. 2. However, it is to be understood that the regulator hereinafter described with reference to FIG. 3 may be used in other fuel metering and injection systems and is not limited to use in the system described with reference to FIG. 2.

Referring now to FIG. 3 the fuel injection system comprises a fuel metering and injecting unit 5 to which air and fuel are provided from the compressor 2 and fuel reservoir 6 respectively via the regulator 10. The fuel is delivered from the reservoir 6 by the low pressure lift pump 3 to the high pressure pump 7 via the through passage 18 in the regulator 10.

The regulator 10 comprises a fuel pressure regulation portion 9 and an air pressure regulation portion 11 incorporated in an integral construction. The fuel regulation chamber 12 has one wall thereof formed by the flexible diaphragm 13 which is secured around its marginal perimeter. The diaphragm 13 has secured therto a valve element 14 which co-operates with the port 15 provided in the wall 17 of the fuel regulation chamber opposite the diaphragm 13. The port 15 communicates with the low pressure fuel passage 18 which in turn communicates with the delivery side of the low pressure pump 3 and the suction side of the high pressure pump 7.

The high pressure fuel inlet passage 20 communicates the fuel regulation chamber 12 with the delivery side of the high pressure fuel pump 7. The one way valve 21 between the passage 18 and the chamber 12 is only lightly pre-loaded, so that during start up the lower pressure fuel may flow from the passage 18 through the fuel chamber 12 to purge the high pressure fuel circuit and injector 5 of air.

The diaphragm 13 is located by the spring 25 so as to normally position the valve 14 to close the port 15. The spring backing plate 24 normally abuts the stop 19 provided on the end wall 26 of the regulator body. The spring backing plate 24 is attached to the diaphragm 27 which divides the control cavity 28. The portion 29 of the control cavity on the spring side of the diaphragm 27 is subject to atmospheric air via the port 22 whilst the portion 30 on the opposite side of the diaphragm 27 may be selectively communicated with the regulated air source via the port 31 and solenoid valve 49. When air pressure is applied through port 31 to the portion 30 of the control cavity 28, the diaphragm 27 and the spring backing plate 24 will be moved to the right as seen in the drawing, to apply further compression to the spring 25. The extent of movement of the backing plate 24 to the right is limited by the edge band 32 of the backing plate 24 contacting the annular shoulder 33 on the regulator body.

Upon the pressure of the fuel in regulation chamber 12 exceeding the regulated pressure, the diaphragm 13 is displaced against the action of the spring 25, and valve element 14 is moved away from engagement with port 15, allowing fuel to flow through port 15 to passage 18 and thus lower the pressure in regulation chamber 12 to that required.

It will thus be seen that the application of the control air to the portion 30 of the control air cavity 28 will increase the spring pressure on the diaphragm 13 by a predetermined amount, which in turn will increase the release pressure of valve element 14 and so the pressure of the fuel delivered to the injector unit 5 by the high pressure pump 7 will be correspondingly increased.

In order to reduce the required pressure of the air admitted to the portion 30 of the control cavity a spring (not shown) may be provided between the backing plate 24 and the end wall 26 to partially counteract the spring 25.

The actuation of the solenoid valve 49, to increase the fuel delivery pressure, may be effected by a suitable engine speed sensor being provided to activate a switch when the engine speed reaches a selected value. The switch when activated energises the solenoid valve 49 so that air from the regulated air supply to the injector unit 5 is admitted to the portion 30 of the control cavity 28. The application of pressure by this air to the diaphragm 27 will move the backing plate 24 so that the edge band 32 will abut the shoulder 33, thus increasing the load applied by the spring 25 to the diaphragm 13 by a set amount.

The operation of the solenoid valve 49 and control cavity 28 to increase the fuel pressure, may be adapted to provide more than one increase in the regulated fuel pressure. Alternatively an electrically operated device may be used to effect the adjustment. The current supplied to the device may be varied to effect the adjustment of the movement of the diaphragm.

An appropriate hysteresis function is preferably incorporated in the actuation of the solenoid valve 49 to prevent 'hunting' between the alternative fuel pressures.

The fuel pressure regulation portion 9, of the composite fuel and air pressure regulator so far described with reference to FIG. 3, may be constructed as an individual fuel pressure regulator wherein the regulated pressure is variable during operation. The desirability of an adjustable injection pressure has previously been discussed as a means of varying the penetration of the fuel into the combustion chamber, and this is equally applicable to injection system where liquid fuel alone is injected as to systems wherein liquid fuel is entrained in air or other suitable gas. According the fuel pressure regulator portion 9 may be used as a variable pressure regulator in injection systems injecting liquid alone.

Continuing with the description of the combined regulator illustrated in FIG. 3 the fuel chamber 12 is in communication, via the passage 35, with the chamber 36 in the air regulation portion 11 and is separated from the air pressure chamber 37 by the diaphragm 38. The air pressure chamber 37 is in communication with the air from the compressor 2 via the passage 39, and air outlet passage 40 leads from chamber 37 to the injector unit 5. The diaphragm 38 carries the valve 41 which co-operates with the port 42 which communicates with the air bypass passage 43.

The spring 45 applied pressure to the diaphragm 38 to normally hold the valve 41 open. Accordingly the valve 41 will open the port 42 when the air pressure in the chamber 37 and the action of the spring 45 together is sufficient to overcome the force created by the fuel pressure in the chamber 36 on the diaphragm 38. Accordingly it will be appreciated that the air pressure will always be less than the fuel pressure by the amoutn represented by the force applied to the diaphragm 38 by the spring 45.

The regulator as above described will in use regulate, relative to atmospheric pressure, the pressure of the fuel supplied to a fuel injection unit 5 by the pump 7, and regulate relative to the fuel pressure, the pressure of the air in the air supply to the fuel injector unit, so that during operation of the fuel injection unit there is a predetermined pressure differential between the fuel and air supplies. In addition, by the application of air pressure to the portion 30 of the control cavity 28, the regulated fuel pressure can be increased by a preset amount, and the air pressure will consequently be correspondingly increased by the same amount so that the same pressure differential is maintained between the fuel and the air supplied to the fuel metering and injection unit. The fuel spray penetration may thus be altered without other adjustments or corrections to the metering of the fuel.

The degree of change in the pressure of the air provided to effect delivery of the fuel-air mixture to the combustion chamber is selected by experiment for each engine depending on the geometry of the engine, and the required degree of fuel penetration with varying load or speed conditions. In one particular example applicable to a two stroke cycle engine with a displacement of 0.4 liters per combustion chamber the air pressure is increased from 250 to 500 KPA at an engine speed of 2500 RPM which is in the mid-speed range of the engine.

The above described fuel pressure regulator, and the integrated fuel and air pressure differential regulator may be used in combination with the fuel metering and delivery system described with reference to FIG. 2 and as disclosed in U.S. Pat. No. 4,693,224 previously referred to and, may be used in the fuelling of a two stroke engine as described in U.S. Pat. No. 4,790,270. By this reference the disclosure in the specifications of said applications is incorporated within this specification by reference.

In the preceeding description with reference to the drawing specific reference has been made to the use of the present invention in conjunction with an engine operating on the two stroke cycle and with spark ignition and reciprocating piston, however it is to be understood that the invention is also applicable to spark ignited engines operatign on the four stroke cycle and/or other configurations such as rotary piston. This invention is applicable to internal combustion engines for all uses and is particularly useful in contributing to fuel economy and exhaust emissions control in engines for or in vehicles including automobiles, motor cycles and boats and including outboard marine engines.

We claim:

1. A method of controlling the fuel distribution in the combustion chamber of a spark ignited internal combustion engine comprising entraining a metered quantity of fuel in a gas under pressure to form a fuel-gas charge, the quantity of fuel being metered in response to the engine load as the fuel is delivered for entrainment into the gas, directly injecting the fuel-gas charge into the combustion chamber through a nozzle under an injection pressure determined by the pressure of the gas so the fuel penetrates into the combustion chamber a distance dependent upon said injection pressure, the fuel-gas charge being injected at one injection pressure when the engine is operation with at least one of engine speed and engine load below a preselected value, and increasing the fuel-gas charge injection pressure in response to said at least one of engine speed and engine load exceeding said preselected value so that the fuel penetrates into the combustion chamber a greater distance at engine loads or speeds above said preselected value, the fuel being maintained at a predetermined pressure differential above the gas over substantially the whole of said at least one of engine speed and engine load.

2. A method as claimed in claim 1 wherein the pressure fo the gas effects delivery of the fuel through the nozzle.

3. A method of fuel distribution as claimed in claim 1 wherein said injection pressure is varied in response to the engine operating at a speed above a predetermined value.

4. A method as claimed in claim 1 or 2 wherein the pressure of the fuel is increased in response to at least one of engine speed and engine load being above said predetermined value whereby the gas pressure is correspondingly increased.

5. A method of controlling fuel distribution in the combustion chamber of an internal combustion engine comprising combining a metered quantity of fuel delivered at a fuel delivery pressure and a gas mass, directly injecting the fuel-gas mixture so formed at a mixture delivery pressure through a nozzle into the combustion chamber, regulating the pressure differential between the fuel and gas mass to maintain a substantially uniform pressure diferential over the engine load, and controlling the pressure of the fuel-gas mixture during delivery to the combustion chamber so said pressure is increased in response to an engine load above a predetermined value, whereby the extent of penetration of the fuel into the chamber is increased.

6. A method of distributing fuel as claimed in claim 5 wherein the pressure of the fuel is regulated to increase in response to said engine load above said predetermined value.

7. A method of distributing fuel as claimed in claim 1 or 5 wherein said predetermined value of engine load is determined by determining the engine attaining a predetermined speed.

8. Method of claim 1 or 5, when used to operate a fuel injection system of an internal combustion engine.

9. Method of claim 1 or 5, when used to operate a fuel injection system in a two stoke cycle internal combustion engine.

10. Method as claimed in claim 1 or 5, when used to operate a fuel injection system in an automobile internal combustion engine.

11. Method as claimed in claim 1 or 5, when used to operate a fuel injection system in an internal combustion outboard marine engine.

12. In a fuel injection system for an internal combustion engine wherein fuel is metered into a gas and pre-pelled by the pressure of the gas into the engine, a combined fuel and gas pressure regulator comprising first means to regulate the fuel pressure to a first predetermined pressure above atmospheric pressure, and second means to regulate the gas pressure to a predetermined value below the fuel pressure.

13. The combination claimed in claim 12 wherein the first means comprise a fuel chamber and an air chamber separated by a movable wall, a fuel inlet port and a fuel return port in said fuel chamber, means to selectively open said fuel return port in response to movement of said wall in one direction, biasing means resisting movement of the wall in said direction, a vent port in said air chamber to admit atmospheric air thereto, said biasing means and atmospheric air in the air chamber together permitting movement of the wall to open the return port when the pressure of the fuel in the fuel chamber is above above said first predetermined pressure.

14. The combination claimed in claim 13 wherein said second means comprises a gas chamber and a further fuel chamber separated by a further movable wall therebetween, said further fuel chamber communicating with the fuel chamber of the first means, and a gas inlet port and a gas by-pass port in said gas chamber, means to selectively open said gas by-pass port in response to movement of said further wall in one direction, further biasing means urging said wall to move in said one direction, said further biasing means and the pressure in said gas chamber effecting movement of said further wall to open said by-pass port when the pressure in the gas chamber is above said predetermined value.

15. The combination claimed in any one of claims 12 to 14 wherein means are provided to selectively increase the force applied by the biasing means to raise said first predetermined pressure of the fuel.

16. A fuel injection system for an internal combustion engine wherein a quantity of fuel is metered under pressure into a gas to form a fuel gas charge, characterized in that the fuel pressure is regulated to a preselected value, wherein the regulated fuel pressure is selectable between at least two predetermined values, and the gas pressure is regulated relative to the fuel pressure to maintain a predetermined pressure differential between the fuel and gas during metering of the fuel.

17. A fuel injection system as claimed in claim 16 wherein the regulated fuel pressure is increased in response to the engine load demand increasing above a predetermined value.

18. A fuel injection system as claimed in claim 16 wherein the regulated fuel pressure is increased in response to the engine speed increasing above a predetermined value.

19. A fuel injection system as claimed in claim 16, 17, 12, 13, or 14, when a component of an internal combustion engine.

20. Fuel injection system of claim 16, 17, 12, 13, or 14, in a two stoke cycle internal combustion engine.

21. Fuel injection system of claim 16, 17, 12, 13, or 14, when a component of an automobile internal combustion engine.

22. Fuel injection system of claim 16, 17, 12, 13, or 14, when a component of an internal combustion outboard marine engine.

* * * * *

UNITED STATES PATENT AND TRADEMARK OFFICE
CERTIFICATE OF CORRECTION

PATENT NO. : 4,993,394
DATED : February 19, 1991
INVENTOR(S) : MCKAY et al

It is certified that error appears in the above-identified patent and that said Letters Patent is hereby corrected as shown below:

On the cover page, Item [73], "Orbital Engine Company Propriety Limited" should read --ORBITAL ENGINE COMPANY PROPRIETARY LIMITED--.

Signed and Sealed this

Fifteenth Day of September, 1992

Attest:

DOUGLAS B. COMER

*Attesting Officer*          *Acting Commissioner of Patents and Trademarks*